United States Patent
Eigruber

(10) Patent No.: US 6,997,596 B1
(45) Date of Patent: Feb. 14, 2006

(54) PLASTIC EXTRUDER SCREW TIP

(75) Inventor: Horst Eigruber, McPherson, KS (US)

(73) Assignee: Extrusion Specialty Products, L.L.C., McPherson, KS (US)

( * ) Notice: Subject to any disclaimer, the term of this patent is extended or adjusted under 35 U.S.C. 154(b) by 81 days.

(21) Appl. No.: 10/236,129

(22) Filed: Sep. 6, 2002

(51) Int. Cl.
*B29B 7/58* (2006.01)

(52) U.S. Cl. ..................................... 366/81

(58) Field of Classification Search ............... 366/81, 366/83–86, 88–90, 297, 300, 301, 319, 322, 366/323; 425/204, 208, 209
See application file for complete search history.

(56) References Cited

U.S. PATENT DOCUMENTS

| 203,284 | A | * | 5/1878 | McKenzie | |
|---|---|---|---|---|---|
| 3,045,283 | A | * | 7/1962 | Keiser | 366/87 |
| 3,942,774 | A | * | 3/1976 | Sokolow | 366/81 |
| 5,501,519 | A | * | 3/1996 | Miyauchi et al. | 366/78 |
| 5,573,331 | A | * | 11/1996 | Lin | 366/81 |
| 6,206,559 | B1 | * | 3/2001 | Kinoshita et al. | 366/81 |
| 6,299,342 | B2 | * | 10/2001 | Eggen et al. | |
| 2003/0206482 | A1 | * | 11/2003 | Griggs | 366/81 |
| 2005/0111294 | A1 | * | 5/2005 | Gates et al. | |

FOREIGN PATENT DOCUMENTS

JP 52-856 * 1/1977

* cited by examiner

*Primary Examiner*—Charles E. Cooley
(74) *Attorney, Agent, or Firm*—Kenneth H. Jack; Davis & Jack, LLC

(57) ABSTRACT

A plastic extruder screw tip having a conical inwardly and forwardly tapering melt converging surface; having first and second dashers fixedly attached to and extending laterally outwardly from the melt converging surface, the dashers being opposingly arranged and having curved distal ends; the plastic extruder screw tip further having a helically threaded screw root mounting cylinder fixedly attached to and extending rearwardly from the melt converging surface, the screw root mounting cylinder having annular outer "O" ring seals nestingly received within "O" ring receiving channels, the screw root mounting cylinder further having an interior oil return conduit.

2 Claims, 3 Drawing Sheets

PLASTIC EXTRUDER SCREW TIP

FIELD OF THE INVENTION

This invention relates to screw drive plastic extruders.

BACKGROUND OF THE INVENTION

Twin screw plastic extruders typically comprise a first cylindrical barrel having a hollow bore extending through the barrel from end to end. A typical cross-section of such hollow bore approximates the shape of a "figure 8" resulting from a longitudinal intersection of paired channels, each channel having a circular cross-section. Paired counter-rotating screw impellers or helical auger impellers are rotatably mounted within such channels, the outer peripheries of the helical flights of such screws being closely fitted to the inner dimensions of such channels. Typically, the flights of such screws intermesh along the longitudinal intersection of the circular channels. Counter-rotation of the screws within such channels effectively conveys plastic powders and melts along the channels, and simultaneously mixes plastic powders and melts at the intersection of the flights.

Precise temperature control of plastic powders and melts conveyed and mixed within the bore of a plastic extruder barrel is typically provided via electric resistance heating and oil flow heating. Electrical resistance heaters are typically wrapped around the outer peripheral surface of the barrel of a twin screw plastic extruder, such heaters effectively controlling the temperature of the barrel. Typically, the roots of the twin screws of the plastic extruder include a hollow bores which serve as oil flow conduits, the bores typically having oil injection tubes extending axially therethrough. Heated oil (or cooling oil) flowing forwardly through such oil injection tubes and returning rearwardly through the oil conveying bores of the roots of such screws provides precise temperature control of the screws. By precisely controlling the temperature of the screws and the temperature of the barrel, precise control of the temperatures of plastic powders and melts which are mixed within and conveyed through the first barrel of the extruder is achieved.

Plastic melt which emits from the downstream output end of the above described "figure 8" shaped extruder barrel bore is necessarily conveyed to an extrusion die for final forming into useful extruded plastic products. An extrusion die adapter is typically utilized to achieve such conveyance, such adapter typically comprising a second axially mounted barrel section whose hollow bore has a "figure 8" shaped input end closely matching the cross-sectional shape of the bore of the first barrel, and whose output end comprises a single smaller channel, typically having a circular cross-sectional shape. The walls of the hollow bore of such extrusion die adapter necessarily define a melt flow conveying channel extending between the "figure 8" shaped input end and the smaller circular channel output end. The wall of the upstream end of such bore typically defines a pair of laterally intersecting conical concavities which taper inwardly and forwardly toward the output end of the adapter.

Heated plastic melt flow within such intersecting conical concavities is commonly irregular, resulting in stagnation of melt on or near the surface of such concavities at or near their input ends. Such melt stagnation undesirably results in hardening and adhesion of small portions of plastic melt upon the interior walls of the adapter. Such hardening and adhesion progressively results in degradation of the hardened plastic which undesirably tends to release into plastic melt which flows downstream into extrusion dyes, resulting in undesirable discoloration and degradation of the final plastic extrusion product.

The instant inventive plastic extruder screw tip solves the above described problem by providing a plurality of cantilevered or laterally extending dashers which move rotatably through the plastic melt as the melt travels through the extrusion dye adapter, such dashers passing through the above described areas which are prone to plastic melt stagnation. The rotary movement of the dashers within the extrusion dye adapter prevents plastic stagnation from occurring, and prevents undesirable discoloration and degradation of plastic extrusion products.

BRIEF SUMMARY OF THE INVENTION

An essential structural component of the instant inventive plastic extruder screw tip comprises an inwardly and forwardly tapered melt converging surface. Preferably, a rearward end of such surface is circular and has a diameter sufficient to co-extensively cover the downstream end of the root of an extruder screw upon which the inventive plastic extruder screw tip is to be mounted. A preferred shape of such melt converging surface is conic, coming to a forwardly extending point, and defining the terminal downstream end of such plastic extruder screw. Suitably, the melt converging surface may be alternately shaped conically (i.e., approximating a cone), spherically (i.e., the domed shape of a section of a sphere), spheroidally (i.e., shapes approximating that of a section of a sphere), or ellipsoidally (i.e., shapes approximating the shape of a section of an ellipsoid); all such shapes facilitating downstream convergence without eddying and stagnation of plastic melt flowing there over.

A plurality of dashers preferably cantilever laterally outward from the melt converging surface, the dashers preferably being evenly radially spaced about a central axis of such surface. Preferably, the laterally extending dashers are formed wholly with the melt converging surface, the dashers and the melt converging surface being milled from a single block of stain resistant steel, or being cast integrally with the melt converging surface. Suitably, though less desirably, the dashers may be attached to the melt converging surface by means of helically threaded bolts or by means of heat fusion welding.

Preferably, the plurality of dashers consists of a first dasher and a second dasher spaced about the axis of rotation of the melt converging surface 180° apart. Suitably, the plurality of dashers may consist of three dashers, spaced 120° apart. Also suitably, though less desirably, the inventive plastic extruder tip may consist of four dashers spaced 90° apart. Also suitably, though less desirably, a single dasher may be utilized. Extension of opposingly paired dashers from the melt converging surface beneficially allows the inventive plastic extruder screw tip to rotate in close proximity with a similarly configured counter-rotating plastic extruder screw tip whose dashers are oriented 90° out of phase, allowing the orbits of the dashers to intersect without jamming dasher against dasher.

The hollow interior bore of a typical extrusion die adapter, of the type which is attachable to the downstream end of the barrel of a twin screw plastic extruder, defines a melt flow transition from the typical "figure 8" shaped bore of such barrel to a circular output channel. Such "figure 8" shape of the barrel is typically continued downstream by the bore of such adapter between one-half inch and one inch. Immediately following such shape extension, the walls of the bore of the adapter curve inwardly, forming a pair of intersecting cone shaped concavities. Thereafter, such cone shaped concavities extend downstream to converge with the adapter's circular output channel. Such curved transition from the parallel walled "figure 8" shaped bore to the intersecting coned shaped concavities constitutes a location of high likelihood of plastic melt stagnation and build up.

In order to allow the dashers of the inventive plastic extruder screw tip to mix and dissipate plastic melt at the above described curved transition melt stagnation area, it is preferable that distal ends of the dashers curve in conformance with the curved shape of such wall transition. At points where the dashers directly underlie such curvature transition, the radii of curvature of the distal surfaces of the dashers are necessarily short, closely matching the radii of curvature of the adapter wall at such transition, such radii of curvature preferably extending toward the axis of rotation of the melt converging surface. Preferably, the radial length of the dashers are fitted so that, at such transition curve, the matchingly curved outer surfaces of the dashers underlie the wall of the die adapter between 20/1000" and 80/1000". Such fitting of the dashers to the inner walls of the adapter assures a high level of movement of plastic melt at the adapter's transition curve, while allowing for slight variations in the alignment of the axial mount of the adapter upon an extruder barrel.

Moving forwardly along the distal surfaces of the dashers from the curved transition described above, the radii of curvature of such surfaces preferably lengthen, allowing such surfaces to curve inwardly from the conical wall of the extrusion dye adapter, and toward the tip of the melt converging surface.

Preferably, each of the dashers is configured as a sturdy structural wall or fin, extending outwardly in a cantilevered fashion from the melt converging surface of the screw tip. Also preferably, such walls or fins extend helically about the melt converging surface and about its axis of rotation in a manner common to the helical pitch of the flights of an extruder screw. In order to lessen shear forces applied by the dashers to the melt flow, it is preferable that the helical pitch of the dashers be within plus or minus 15° of the pitch of the flights of an extruder screw to which the inventive screw tip is to be attached.

Screw root attaching means are necessarily provided for interconnecting the inventive screw tip with a plastic extruder screw. Preferably, such means comprises a circular cylinder formed wholly with the forward cone, such cylinder extending rearwardly from the rearward end of the melt converging surface, such cylinder preferably having helical threads which are fitted for mating helically threaded mounting upon mounting threads of the downstream end of the root of an extruder screw. Where the root of such extruder screw comprises an interior oil conduit, the preferred helically threaded cylinder preferably further functions as a leak preventing plug or cap. The interior of such cylinder also preferably comprises an oil return conduit.

Where the inventive plastic extruder screw tip comprises an oil returning plug or cap, "O" ring receiving channels are preferably milled within the outer peripheral surface of the rearwardly extending cylinder, such channels receiving "O" rings for preventing oil leakage.

Accordingly, it is an object of the present invention to provide a plastic extruder screw tip having melt stagnation preventing dashers extending laterally therefrom.

It is a further object of the present invention to provide such a screw tip having dashers which are further adapted and configured for rotation through extruder die areas posing high risks of plastic melt stagnation.

It is a further object of the present invention to provide a plastic extruder screw tip having dashers which are further adapted for reduction of sheer forces applied to plastic melt flow.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
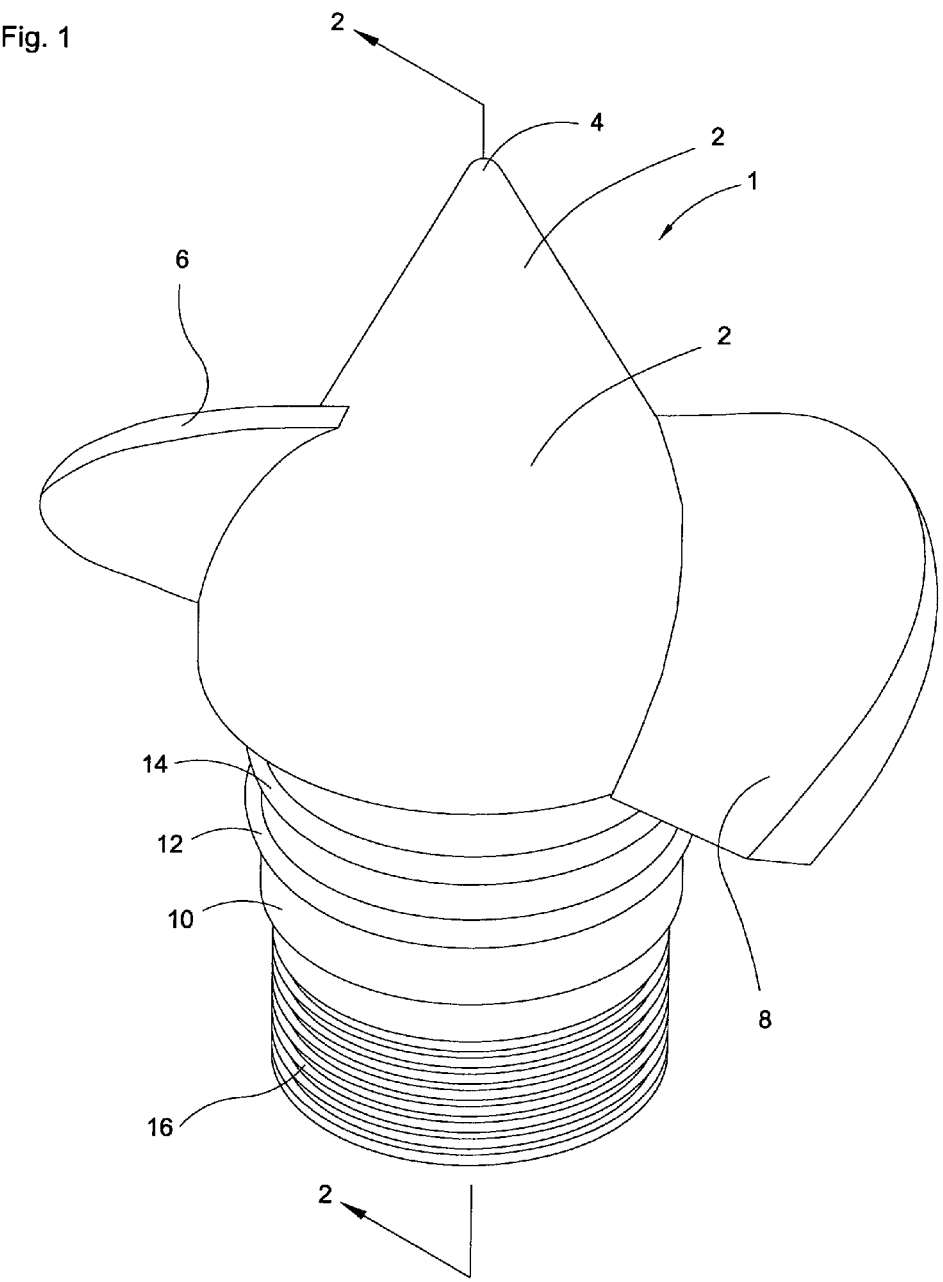
FIG. 1 is an isometric view of the instant inventive plastic extruder screw tip.

Referring now to the drawings, and in particular to FIG. 1. The instant inventive plastic extruder screw tip is referred to generally by Reference Arrow 1. The screw tip 1 has a cone shaped plastic melt converging surface 2 which, when attached to the downstream end of the root of an extruder screw (not depicted), defines the terminal downstream end of such screw at tip 4. Laterally extending and opposingly arranged dashers 6 and 8 cantilever from the melt converging surface 2.

Figure 2:
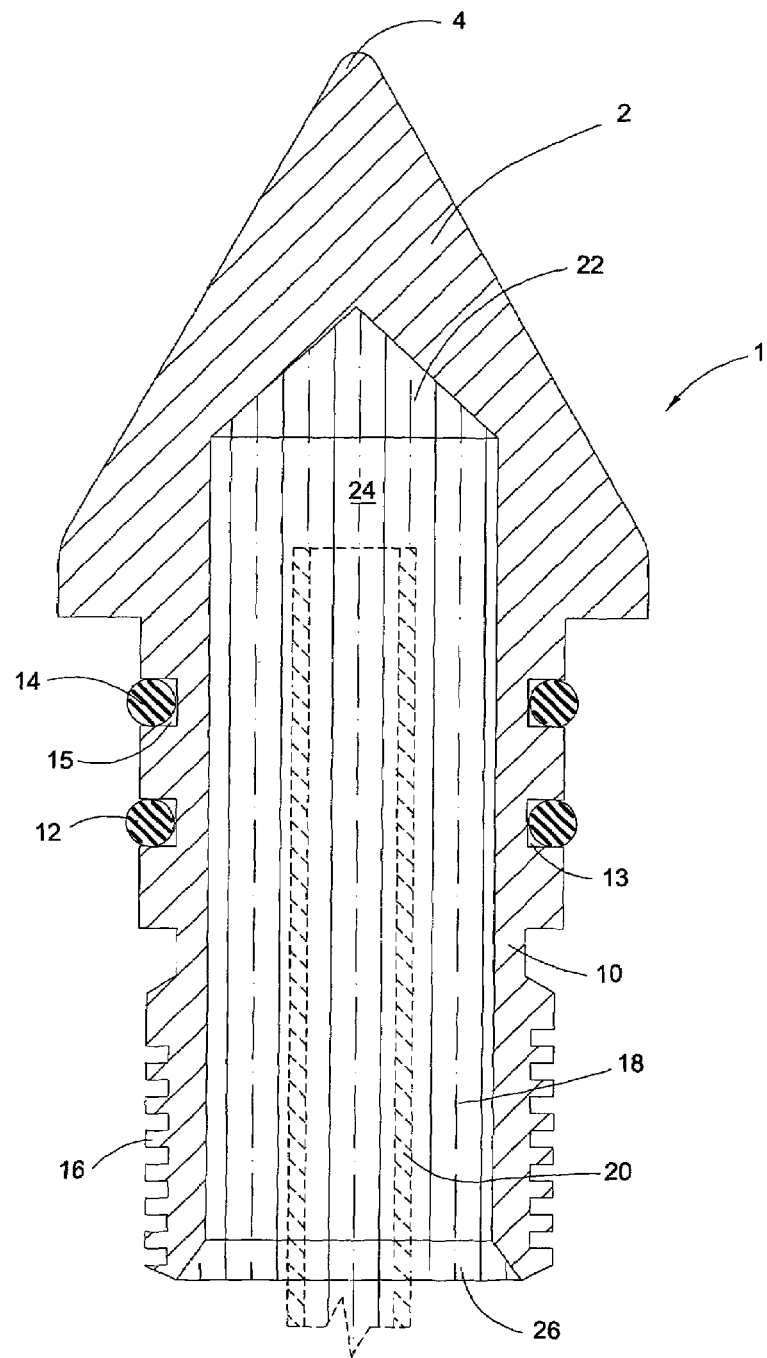
FIG. 2 is a sectional view as indicated in FIG. 1.

Referring simultaneously to FIGS. 1 and 2, screw root attaching means in form of cylinder 10 extends rearwardly from cone 2, the cylinder 10 having helical mounting threads 16, "O" ring receiving channels 13 and 15, and oil sealing "O" rings 12 and 14. The interior of the inventive screw tip 1 preferably defines an oil return channel 18 into which extends an oil injection tube 20. Heating and cooling oil 24 emitting from oil injection tube 20 returns to the hollow bore of the root of an extruder screw (not depicted) via oil return channel 18, emitting rearwardly from the screw tip 1 from rear opening 26. A conical cavity 22 at the forward end of the oil return channel 24 assists in the rearward redirection of oil 24 emitting forwardly from tube 20.

Figure 3:
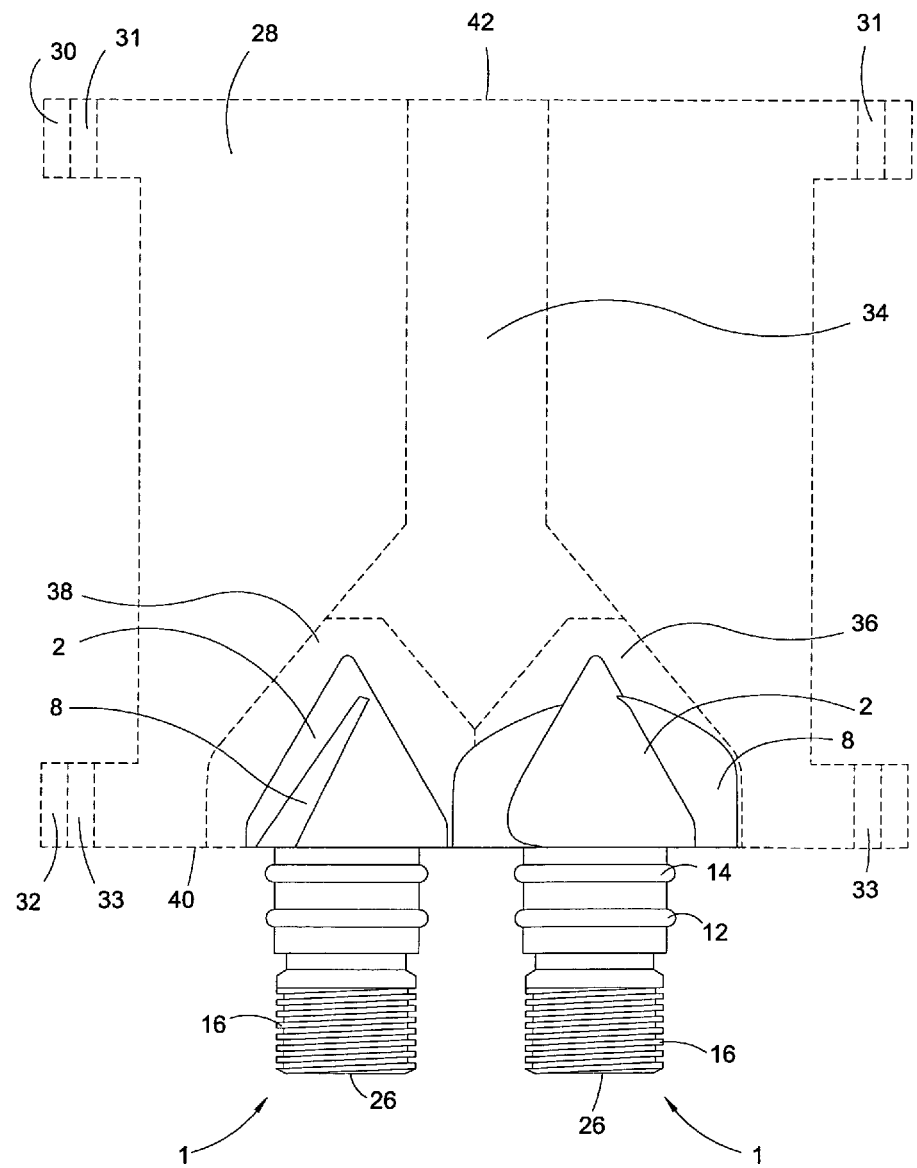
FIG. 3 depicts a pair of the screw tips depicted in FIG. 1 in side view, said screw tips being shown representationally in use in conjunction with an extrusion die adapter.

Referring to FIG. 3, an extrusion die adapter 28 is depicted representationally in dashed lines. The extrusion die adapter die 28 has an annular rear flange 32 having bolt receiving apertures 33, the rear flange 32 being fitted for bolted attachment to the downstream end of the barrel of a twin screw extruder (not depicted). The forward end of the extrusion die adapter 28 similarly has an annular flange 30 having bolt receiving apertures 31, such flange 30 being fitted for bolted receipt of the input or upstream end of various extrusion dies (not depicted.

Referring further to FIG. 3, the rearward or upstream ends of cone shaped concavities 36 and 38 preferably matches the typical "figure 8" configuration of the cross-section of the bore of a twin screw extruder (not depicted). Plastic melt flowing downstream through the cone-shaped concavities 36 and 36 enters circular channel 34 to emit from the output 42 of the die adapter 28. Thereafter, the plastic melt flows into an extrusion die (not depicted).

Referring further to FIG. 3, paired renditions of the instant inventive plastic extruder screw tip 1 have oppositely pitched dashers 8 matching the oppositely pitched flights of typical counter-rotating plastic extrusion screws. As depicted, the curves of the upstream ends of the dashers 8 preferably match the transition curvature of the upstream ends of the cone-shaped concavities 36 and 38, preventing plastic melt stagnation at such curved transition zones.

Referring further to FIG. 3, in operation of the inventive extruder screw tip 1, dashers 8 continually rotate within cone shaped concavities 36 and 38, causing the outer distal surfaces of the dashers to "wipe" the inner walls of the extrusion die adapter 28 at the upstream curvature transition of such walls. Such "wiping" action prevents plastic melt stagnation, prevents adhesion of hardened plastic upon the inner walls of the die adapter 28, and ultimately prevents discoloration and degradation of final extruded plastic products.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A plastics extruder screw tip comprising:
    (a) an inwardly and forwardly tapered melt converging surface; and,
    (b) at least a first dasher, the dasher having a proximal and a distal end, the proximal end being fixedly attached to or formed wholly with the inwardly and forwardly tapered melt converging surface; the inwardly and forwardly tapered melt converging surface forming a shape selected from the group consisting of conic shapes, conical shapes, spheric shapes, spheroidal shapes, and ellipsoidal shapes; the inwardly and forwardly tapered melt converging surface having an axis of rotation, the distal end of the at least first dasher comprising a curved surface having radii of curvature extending toward the axis of rotation; the proximal and distal ends of the at least first dasher extending helically about the axis of rotation; the curved surface of the distal end of the at least first dasher having a rearward end and a forward end, the curved surface's radii of curvature progressively lengthening; and further comprising a second dasher, the at least first dasher and the second dasher being arranged opposingly about the axis of rotation; the inwardly and forwardly tapered melt converging surface having a rearward end, and further comprising screw root attaching means comprising a helically threaded circular cylinder fixedly attached to or formed wholly with said rearward end; the helically threaded circular cylinder comprising an interior oil return conduit.

2. The plastics extruder screw tip of claim 1 wherein the helically threaded circular cylinder comprises at least a first annular channel, and further comprising at least a first "O" ring seal nestingly received within the at least first annular channel.

* * * * *